(12) United States Patent  (10) Patent No.: US 8,640,672 B2
Carlström et al.  (45) Date of Patent: Feb. 4, 2014

(54) ENGINE BRAKE FOR VEHICLE

(75) Inventors: Peter Carlström, Hisings Backa (SE); Per Larsson, Billdal (SE)

(73) Assignee: Volvo Lastvagnar AB, Göteborg (SE)

( * ) Notice: Subject to any disclaimer, the term of this patent is extended or adjusted under 35 U.S.C. 154(b) by 943 days.

(21) Appl. No.: 12/520,222

(22) PCT Filed: Dec. 20, 2006

(86) PCT No.: PCT/SE2006/001459
§ 371 (c)(1), (2), (4) Date: Oct. 14, 2009

(87) PCT Pub. No.: WO2008/076013
PCT Pub. Date: Jun. 26, 2008

(65) Prior Publication Data
US 2010/0101531 A1  Apr. 29, 2010

(51) Int. Cl.
*F02D 9/06*  (2006.01)
(52) U.S. Cl.
USPC .............................. 123/323; 60/602
(58) Field of Classification Search
USPC ................ 123/321–323, 568.18, 568.19, 123/568.23–568.26; 60/600–602, 424, 60/605.2
See application file for complete search history.

(56) References Cited

U.S. PATENT DOCUMENTS 4,658,587 A * 4/1987 Ecomard ......................... 60/602
5,755,101 A * 5/1998 Free et al. ....................... 60/602

(Continued)

FOREIGN PATENT DOCUMENTS

EP  1275833 A1  1/2003
GB  2390642 A  1/2004

(Continued)

OTHER PUBLICATIONS

Supplementary European Search Report for corresponding EP 06 83 5877.

(Continued)

*Primary Examiner* — John Kwon
*Assistant Examiner* — Johnny Hoang
(74) *Attorney, Agent, or Firm* — WRB-IP LLP

(57) ABSTRACT

An engine brake system and a method for controlling the exhaust gas pressure of an exhaust system for a vehicle provided with an engine are provided. The system includes a main exhaust gas conduit connected to the turbine of a turbo arrangement and an Exhaust Pressure Governor (EPG) which is used to create a backpressure in the exhaust system so as to function as an engine brake. The turbo arrangement includes a Variable Geometry Turbine (VGT). The Exhaust Pressure Governor is located in a bypass conduit which is connected to the main exhaust conduit upstream the connection to the turbine of the turbo arrangement and the main exhaust conduit includes a valve arrangement downstream the bypass conduit connection for closing the main exhaust conduit. According to the method for controlling the system, the flow passage through the main conduit is open and the flow through the bypass conduit is closed in response to an output control indicating that no engine braking is desired. In case there is an output control indicating that engine braking is desired, the flow passage through the main conduit is closed and the flow through the bypass conduit is open whereby the EPG is controlled to provide a desired backpressure according to the control signals from the control system.

11 Claims, 1 Drawing Sheet

(56) References Cited

U.S. PATENT DOCUMENTS

| | | | |
|---|---|---|---|
| 5,839,281 A * | 11/1998 | Sumser et al. | 60/602 |
| 5,884,482 A * | 3/1999 | Lange et al. | 60/624 |
| 6,295,814 B1 | 10/2001 | Schmidt et al. | |
| 6,408,834 B1 | 6/2002 | Brackney et al. | |
| 6,594,995 B2 * | 7/2003 | Heyes | 60/602 |
| 6,751,956 B2 | 6/2004 | Mayer et al. | |
| 7,004,142 B2 * | 2/2006 | Ball et al. | 123/323 |
| 7,308,886 B2 * | 12/2007 | Balles et al. | 123/321 |
| 2002/0092300 A1 * | 7/2002 | Schmidt et al. | 60/602 |
| 2003/0178002 A1 * | 9/2003 | Israel et al. | 123/321 |
| 2003/0188532 A1 * | 10/2003 | Ball et al. | 60/602 |
| 2006/0118081 A1 * | 6/2006 | Ball et al. | 123/323 |
| 2006/0174620 A1 * | 8/2006 | Albat | 60/599 |

FOREIGN PATENT DOCUMENTS

| | | |
|---|---|---|
| WO | 9526466 A1 | 10/1995 |
| WO | 03001041 A1 | 1/2003 |
| WO | 2007090532 A1 | 8/2007 |

OTHER PUBLICATIONS

International Search Report for corresponding International Application PCT/SE2006/001459.

* cited by examiner

ENGINE BRAKE FOR VEHICLE

BACKGROUND AND SUMMARY

The invention relates to an engine brake for a vehicle in general and in particular to the arrangement of an Exhaust Pressure Governor (EPG) working as an engine brake in an engine provided with a turbo compressor comprising a Variable Geometry Turbine (VGT). The invention also relates to a method for controlling an engine brake operation and an exhaust gas pressure.

The use of engine brakes in general and Exhaust Pressure Governors (EPG) for controlling the engine braking power of an internal combustion engine in a motor vehicle is known in the art. Details of such an arrangement are for example disclosed in WO 95/26466. This device includes a control unit which includes a microprocessor, to which there is fed relevant engine data and vehicle data for computing and continuously varying the degree of charging, so that the retardation of the vehicle during braking can be controlled towards a command value set by the driver.

With reference to FIG. 1, the conceptual idea in WO 95/26466 is described for a system comprising a six-cylinder diesel engine 1 with a gearbox 15. A turbo compressor 5, has its turbine portion 6 connected to the engine exhaust manifold 5 and its compressor portion 7 connected to the intake conduit 8 of the engine 1. The outlet 16 of the turbine 6 is connected to an exhaust pressure governor 10 comprising a damper housing 17 and a pneumatic control means 18 connected to a source of compressed air via a control valve 11 in such a way that the damper can be set continuously variably between the completely open position and the completely closed position. A control unit 12 provides output signals for turning the compression braking device on or off and for setting the exhaust pressure governor 10 damper as a function of various engine and vehicle data such as charge pressure (degree of charging), engine rpm and air temperature, i.e. engine data, and signals representing ABS on/off, vehicle speed, clutch pedal position, accelerator position, cruise control on/off and retardation level, i.e. vehicle data.

As an alternative, it is stated that a turbo unit with variable control of the turbo compressor (e.g. a VGT) or variable control of the turbo compressor waste gate can be used to vary the degree of charging of the engine. As still an alternative, these additional control units may be used together with the EPG.

Hence, it is suggested in WO 95/26466 that an EPG may be used together with a variable control of the turbo compressor in the arrangement described therein.

However, the suggested arrangement in WO 95/26466 has certain drawbacks such as fitting the EPG device together with the VGT so as to provide an engine having the desired shape and design for fitting into the engine compartment. Furthermore, in order to provide efficient engine characteristics, engine performance and fuel consumption optimization, while not using the EPG device as an engine brake, the EPG should not cause a restriction of the exhaust gas stream when not used for creating a backpressure. Hence, the exhaust gas conduit forming part of the EPG should, when open and not operating as an engine brake, have the same size as of the ordinary exhaust gas conduit in order to perform in a desired way. This demand of the constructional aspects limits the possibility of reducing the EPG to a desired size. The incorporation of a turbo compressor waste gate as a pressure regulator in this arrangement would also give rise to similar problems as for the EPG described in WO 95/26466. Furthermore, it is usually hard to control such a waste gate with desired accuracy.

The above described disadvantages could be overcome by not using an EPG or a waste gate and only use a VGT to control the exhaust back pressure. However, as in the case of the waste gate, the VGT is not easy to control with the sufficient accuracy to provide the desired back pressure, in particular when it shall have the ability to control the backpressure for a wide range of pressures from small back pressures for heating the exhaust gases when starting the engine or idling to the large back pressures needed to make the system function as an efficient engine brake. In particular, there is a problem to control the VGT so as to provide and regulate a large back pressure to a desired level. In general, there is a need for a considerably higher backpressure when an engine brake operation is desired then when a heating function is desired.

Hence, there is a need for an improved system which accurately may control the exhaust back pressure to provide an efficient engine brake while at the same time providing a system which may be designed to fit the constructional and physical requirements of the components so as to make the mounting and assembling of the engine and fitting it into the vehicle easy. Furthermore, the engine brake shall preferably interfere as little as possible with the engine operation when not in use so as to avoid an undesired backpressure when not needed. It is also desirable to provide a system which may provide a desired backpressure over a wide pressure range and may be used for braking of the engine as well as for heating of the exhaust gases in the exhaust gas system.

The engine brake system and method for operating the system according to the present invention overcomes the described drawbacks of earlier systems. In this context, an engine brake or an engine brake operation refers to a device or a method which is used for slowing down or restricting the speed of the engine and thus the speed of the power train and the vehicle. The engine brake system may be used in any kind of vehicle provided with en engine but the system is in particular suitable for larger vehicles such as commercial trucks or the like load carrying vehicles wherein the appropriate use of en engine brake is important for security and environmental reasons. The engine brake system disclosed herein comprises a main exhaust gas conduit connected to the turbine of a turbo arrangement which comprises a Variable Geometry Turbine (VGT). VGT is known per se to the skilled person in the art and the incorporation of such a device increases the controllability of the system and is commonly used in many engines today. The system further comprises an Exhaust Pressure Governor (EPG). An EPG as described herein is a device which has the ability to create a desired backpressure in the system so as to function as an engine brake. In order to achieve a desired braking force, the EPG shall be able to be set at different levels and is preferably controlled to either stepless or stepwise be changed to provide the desired backpressure. The present invention is characterized in that the EPG is located in a bypass conduit which is connected to said main exhaust conduit upstream the connection to the turbine of the turbo arrangement, i.e. in a common engine having an exhaust gas system, the bypass channel is located downstream a exhaust gas manifold collecting the exhaust gases from the cylinders and upstream of the inlet of the exhaust gases to the turbine of the turbo arrangement. The main exhaust conduit also comprises a valve arrangement downstream the bypass conduit connection for closing the main exhaust conduit. This valve may be a separate valve in the main exhaust conduit and in this case preferably located between the turbine of the turbo and the connection of the bypass conduit to the main conduit. As an alternative, the valve may be a functional part of the turbine which may close the inlet to the turbo, e.g. a VGT adapted to completely shut off the inlet flow. As still another alternative, a valve may be located at the connection of the bypass conduit to the main exhaust conduit and direct the flow either to the bypass or the main conduit.

This arrangement provides the benefits of allowing the bypass passage and the EPG to be smaller and always provide a restricted flow without the drawback of an additional backpressure caused by the EPG device during engine operation when no back pressure is desired since the bypass conduit will only be used when an elevated backpressure is desired, e.g. when the engine is performing positive work. In case the EPG and turbo are connected in series, the demand of having a low pressure drop in case of positive work implies a location of the EPG downstream the turbo and directly connected to the same, thus avoiding bent or restricted pipes contributing to a pressure drop. In case the EPG and the turbo are connected in parallel, it is not essential to avoid a built in pressure drop in the bypass conduit arising from rather long, small and bent pipings since there is always a desire of a restricted flow when using the bypass conduit comprising the EPG. It may even be an advantageous feature to have a built in pressure drop in the bypass conduit in the case of a parallel arrangement. Hence, the parallel arrangement allows the EPG itself to be smaller than in a series arrangement and the bypass conduit to be rather long, including bendings and having rather small dimensions without any negative effect. This contributes to the possibility of locating a rather small EPG arrangement at a desired location and thus providing a rather small and compact overall size and desired shape of the engine structure.

According to the reasoning above, there is a possibility according to one embodiment to construct a small device having a constant large flow restriction characteristic which is intended to only function when there is a need for a rather large backpressure, e.g. above 5 bar, when the EPG is intended to be used only as an engine brake. To be noted, the restriction shall however not be above the lowest value which may be desired to use when the EPG is completely open and the constant, minimum restriction may be set to 2 bar.

In this case it will be possible to use the VGT for creating the lower backpressures. In vehicles today, backpressure regulating systems comprising only a VGT for controlling the whole range of backpressures has been used. It has turned out that it is difficult to provide the desired control of the backpressure over the complete range but if the VGT only will be used for creating small backpressures, e.g. up to 5 bars, the VGT will work more efficiently as an engine exhaust pressure control device.

According to another embodiment, it is possible to design the EPG to be used for somewhat lower backpressures, e.g. for controlling backpressures from 3.5 bars and above and even more preferably from at least 2 bar, in case there is an additional desire to use the EPG as a tool for creating a heating of the engine in case of idling, low load, general heating purposes or an engine brake for low backpressures.

The EPG may of course function over the complete range of backpressures but in that case there is a demand to have a free flow of exhaust gases equal to the free flow in the main conduit and the size of the EPG and bypass conduit must be larger than when the bypass only is used for a restricted flow.

Even though the EPG may be constructed to control back pressures as low as 3.5 bars or 2 bars or lower, it may be desired to incorporate a VGT in the main exhaust conduit which may control backpressures up to 2 bars, more preferably 3.5 bars or most preferably to 5 bars. The use of overlapping ranges may be useful when there are different desires for creating the backpressure. The use of the VGT for creating the backpressure in certain circumstances is beneficial from the point of view that it may be desired to use the kinetic energy of the exhaust gas stream for loading the turbo when there is a desire for a small backpressure, e.g. warming up or low load situations. In the cases when there is a need for a large backpressure, e.g. an engine brake operation, there is a lesser need to drive the turbo. Hence, this system provides efficient control of the backpressures depending on if there is a desire for an engine brake operation by the use of the bypass conduit or if there is a desire to provide a driving force of the turbo assembly while creating a small backpressure for heating of the exhaust gases by the use of a restriction, e.g. a VGT, in the main exhaust conduit.

Suitable devices to be used as an EPG in the present invention are described in for example WO 95/26466 or WO 03/001041. These EPGs are connected to a source of compressed air and a pressure regulator which may set the backpressure to a desired level. Hence, the EPG is controlled by the pressurized air to open at a pressure above the set pressure and close when the exhaust pressure is below the set pressure.

The flow restricting means, e.g. the EPG, the control valve or valves directing the flows through the main conduit and the bypass conduit and the VGT, are controlled by an ECU which based on engine parameters and driving conditions control the EPG to create the desired backpressure by setting the valves to direct the flow in the desired path and control the flow restricting means (flow regulators) to the desired value of the backpressure.

As described above, the engine brake system may have a VGT in the main conduit which is adapted to control the backpressure when a relatively small backpressure is desired, e.g. up to 5 bars or even more preferably below 3.5 bars and most preferably below 2 bars. The VGT may also be designed to include the feature of completely shutting off the main exhaust conduit. However, it may also be possible to use some other kind of flow regulators instead or in addition to the VGT, e.g. a relatively simple valve having a few pre set levels of flow restricting dimensions. This flow restricting valve may be the same as the flow restricting valve which is used to cut off the flow in the main conduit. This restriction arrangement is intended to create a controlled small back pressure e.g. for heating.

The main exhaust conduit may also be provided with a separate flow valve which can be used as a switch to fully open or completely cut of the flow in the main exhaust conduit.

In an embodiment of the invention, the bypass conduit comprising the EPG, is connected to the main exhaust conduit downstream of an exhaust gas manifold receiving the exhaust gases from the cylinders and upstream the turbo arrangement.

The invention also relates to a method for controlling the exhaust gas pressure of an exhaust system comprising:

A main exhaust gas conduit connected to an exhaust manifold collecting exhaust gases from the cylinders of the engine A turbo arrangement, comprising a Variable Geometry Turbine (VGT), having its turbine connected to the main exhaust conduit.

A bypass conduit connected to the main exhaust conduit upstream the turbo arrangement An Exhaust Pressure Governor located in said bypass conduit A valve arrangement for controlling the exhaust gas flow to flow through the main exhaust conduit or the bypass conduit comprising the Exhaust Pressure Governor A control system which controls the Exhaust Pressure Governor, the Variable Geometry Turbine and the valve arrangement for controlling the exhaust gas flow to flow through the main exhaust conduit or the bypass conduit.

The control system controls the exhaust gas system in such a way that the flow passage through the main conduit is open and the flow through the bypass conduit is closed in response to an output control indicating that no engine braking is desired. In case there is an output control indicating that engine braking is desired, the flow passage through the main conduit is closed and the flow through the bypass conduit is open. When the exhaust gas flow is flowing through the bypass conduit, the EPG is controlled to provide a desired backpressure according to the control signals from the control system.

The present arrangement allows the system to take advantage of the facts that when an engine brake operation is wanted there is obviously not a desire to use the engine for driving purposes why a large back pressure is not contradictive to a desired driving force as the case is for example when heating the engine gases at start-up of the engine. Hence, the bypassing of the turbo in an engine brake operation is not considered to have any major negative effect for the operation of the engine since the need for the pressurised air from the turbo to the cylinders is decreased.

According to an embodiment of the control method of the invention, the control system controls the exhaust gas system in such a way that the flow passage through the main conduit is closed and the flow through the bypass conduit is open when there is an output control indicating that engine braking is desired whereby the backpressure needed is at least 2 bar, more preferably at least 3.5 bars and most preferably at least 5 bars, whereby the EPG is controlled to provide a desired backpressure according to the control signals from the control unit. This control strategy may as well be used for other purposes when there is a need for creating a backpressure without the desire to propel the turbine of the turbo assembly.

According to one aspect of the control method of invention, the VGT is adapted to provide the back pressure demand up to a certain limit of the backpressure, e.g. somewhere between 2-5 bars, corresponding to a heat mode or low load mode, while the backpressure above the same certain limit is created by the use the EPG. In this case, the control system may control the exhaust gas system in such a way that the flow passage through the main conduit is open and the flow through the bypass conduit is closed in response to an output control indicating that no engine braking is desired and there is a desire to heat the gases, whereby the backpressure needed is at most 5 bar, more preferably at most 3.5 bars and most preferably at most 2 bars, whereby the VGT or a valve arrangement in the main conduit is controlled to provide a desired backpressure according to the control signals from the control unit.

According to still another aspect of the invention, the VGT and the EPG may have an overlapping region of controlled backpressures (e.g. 2-5 bars) in which either of the devices may work as the pressure regulating device, e.g. depending on if there is a desire to provide the turbo with a driving force from the turbine in the main exhaust conduit. If a backpressure is desired below a limit (e.g. 2 bars), it will be exclusively the VGT which is used for the back pressure and if a backpressure above a certain limit is desired (e.g. 5 bars) the EPG will be exclusively used.

Depending on the design of the different components of the system, in particular the VGT and the bypass channel including the EPG, different control logics may be used to optimize the function of controlling the backpressure in the exhaust system. A general rule for a control strategy which is suitable for the present arrangement is to direct the exhaust flow through the EPG in the bypass conduit when a large backpressure (or an engine brake operation) is desired and direct the flow through the main exhaust conduit when there is desired a small backpressure (heat mode) or it is desired to take benefit of the kinetic energy in order to uses the turbo aggregate.

The control system is intended to direct the flow to either of the main exhaust conduit or the bypass conduit. It would of course be possible to divide the flow into portions being guided to both conduits but the control of the exhaust backpressure is easier managed and the accuracy of the level of the backpressure is better regulated when the whole flow is guided to either one of the conduits.

There are several ways of controlling the flows of the exhaust stream. According to a first method, the control of the flows may be performed by the use of a first, main valve provided in the main exhaust conduit which may switch between being open and cut off the flow completely in main exhaust conduit and a second valve provided in said bypass conduit comprising the EPG, said valve adapted to switch between being open and cut off the flow completely. These valves may either be provided separately or be a part of the EPG and/or the VGT. The specific arrangement of the valve arrangements for cutting of the flow to the exhaust main conduit and the bypass conduit is not essential. The main point is that there is a sufficient restriction in the flow through the main exhaust conduit when the EPG in the bypass shall be used as a flow controlling unit such that efficient flow control can be achieved.

According to another embodiment, the flow may be regulated by a separate valve in the conjunction of the main exhaust conduit and the bypass conduit such that it closes one of the conduits while opening the other conduit.

DETAILED DESCRIPTION

Figure 2:
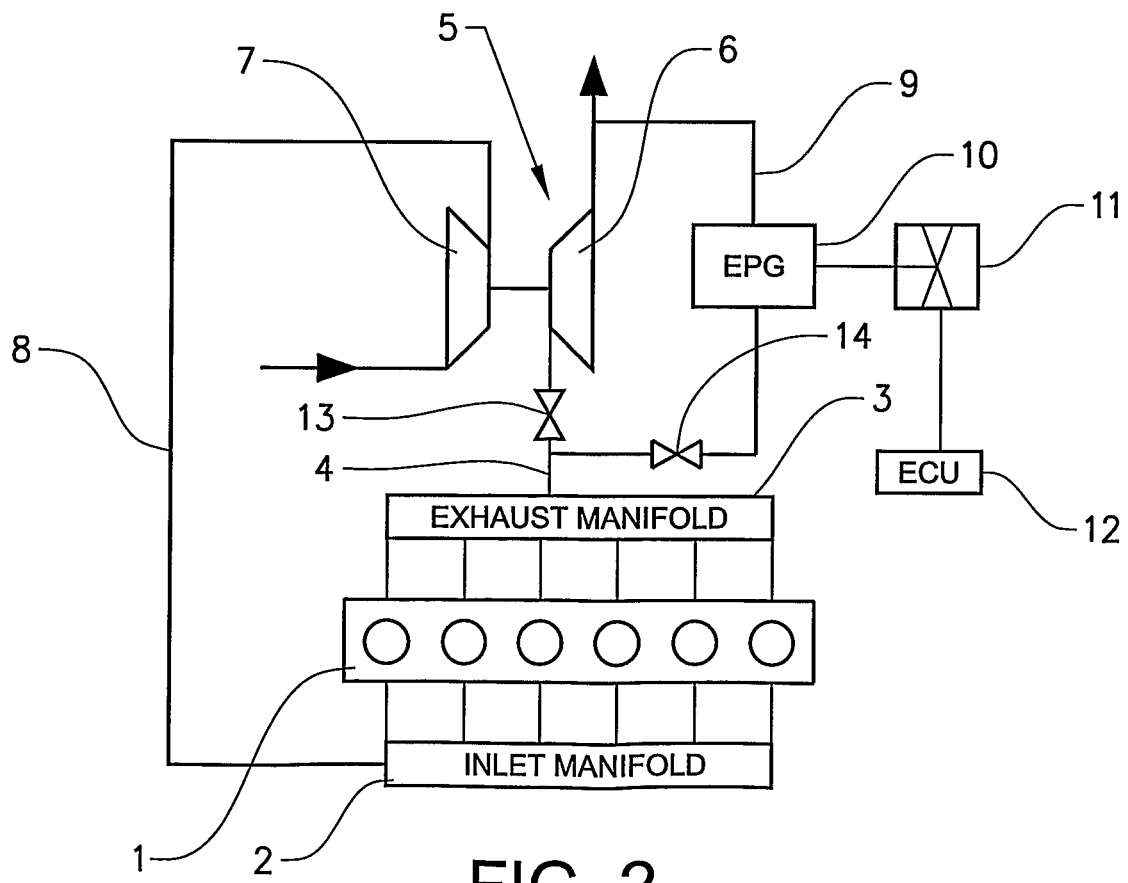
FIG. 2 shows an engine exhaust pressure regulating system according to the present invention

FIG. 2 shows schematically a six-cylinder diesel engine 1. The engine is provided with an inlet manifold 2 and an exhaust manifold 3. The exhaust manifold 3 is connected to a main exhaust gas conduit 4 which in turn is connected to a turbo assembly 5. The turbo assembly comprises a turbine portion 6 and a compressor portion 7. The turbine 6 is connected to the main exhaust conduit 4 and the compressor portion 7 is connected to an air intake conduit 8 which in turn is connected to the inlet manifold 2. The main exhaust gas conduit 4 is further connected to a bypass conduit 9 downstream the exhaust manifold 3 and upstream the turbo assembly 5. An Exhaust Pressure Governor (EPG) 10 is located in the bypass conduit. The EPG 10 is connected to air pressure control valve 11 for regulating the air pressure from a source of compressed air (not shown). The control valve 11 is further connected to an Electronic Control Unit (ECU) 12 which provides output signals for turning the compression braking device on or off and for controlling the EPG 10 to provide a desired back pressure as a function of various engine and vehicle data such as charge pressure (degree of charging), engine rpm and air temperature, i.e. engine data, and signals representing ABS on/off, vehicle speed, clutch pedal position, accelerator position, cruise control on/off and retardation level, i.e. vehicle data. Hence, the ECU 10 may be connected to any kind of sensors or data providers which is considered to be useful for deciding if there is a desire for an elevated exhaust pressure and the desired pressure level in the exhaust gas system. The system further comprises a first valve arrangement 13, connected to the ECU 10, which may be used to cut off the flow in the main exhaust conduit 4. In this figure, the valve arrangement is illustrated as a separate valve. However, the main cut off valve 13 may be located in association with or be an integrated part of the turbine 6. In still another embodiment, the cut off function may be a feature of the turbine 6 which is Variable Geometry Turbine. The bypass conduit 9 comprises a second valve arrangement 14, also illustrated as a separate valve and connected to the ECU, which is used to cut off the flow in the bypass conduit 9. The bypass valve 14 may also be located in association with or be an integrated part of the EPG 10. In still another embodiment, the bypass valve 14 may be replaced with a cut off function of the EPG 10 which may be set to a pressure high enough to withstand the exhaust gas pressure so as to direct the flow of the exhaust gases to the main exhaust conduit 4. In still a further embodiment, the valves 13, 14 may be replaced by a valve positioned in the conjunction of the main exhaust conduit 4 and the bypass conduit 9 in such a way that it closes the flow path to one of the conduits 4, 9 while opening the flow path to the other conduit 4,9. Whatever arrangement that is chosen for controlling the flows to the different conduits, it is connected to and controlled by the ECU 10.

Figure 1:
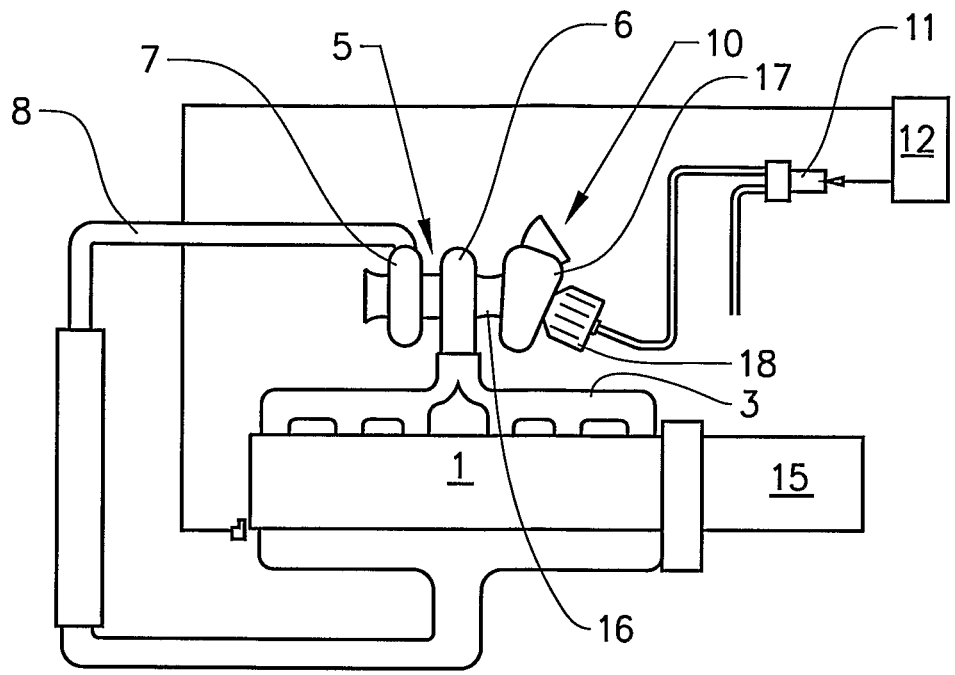
FIG. 1 shows an engine exhaust pressure regulating system according to prior art

As is obvious by comparison to the prior art shown in FIG. 1, the present system shown in FIG. 1 differs from prior art in that the EPG 10 is located in a bypass conduit 9 which thereby enables the exhaust gases to pass through the main exhaust conduit 4 without passing by the EPG 10. This feature enables the possibility to construct a compact exhaust system which does not involve an unnecessary backpressure when no extra backpressure is desired.

The system may of course also include other devices commonly used in exhaust gas system today such as different kinds of filters, catalysts absorbers and the like devices for treating the exhaust gases as well as Exhaust Gas Recirculation (EGR) conduits, air intake filter and Charge Air Cooler (CAC) for treatment of the intake air.

In the following, it is disclosed how the system is controlled in order to achieve the desired effects of an efficient engine braking. The ECU 10 receives signals from different sensors or data providers (not shown) which are considered to be relevant for deciding if there is a desire of an elevated backpressure in the exhaust gas system. In the normal driving condition, i.e. when it is decided by the ECU 10 that there is no need for an engine brake operation, the flow passage through the main conduit is open and the flow through the bypass conduit is closed. In case it is decided by the ECU 12 from the input operating data and parameters that it is desired with an engine brake operation, control signals are sent to close (or keep closed) the main conduit valve 13 and open (or keep open) the bypass valve 14. In case these valves are r placed with other arrangements for closing respectively opening the flow paths of the conduits, it is obvious for the skilled person in the art to program the ECU 12 to send out the appropriate control signals to close respectively open the flow paths of the main conduit 4 and the bypass conduit 9. The ECU 12 further send out control signals to the to air pressure control valve 11 such that it controls the EPG 10 to provide a desired backpressure according to the control signals from the control system.

In an embodiment of the invention, this control strategy is used when there is an output control from the ECU 12 indicating that the backpressure needed is at least 2 bar, more preferably at least 3.5 bars and most preferably at least 5 bars, whereby the EPG 10 is controlled to provide the desired backpressure according to the control signals from the control unit.

The control of the engine exhaust pressure system may further include the feature of controlling the system to provide an elevated backpressure for other purposes than engine braking, e.g. for heating the exhaust gases at cold starting, when idling or in low load driving situations, when there is a desire to let the exhaust gases propel the turbine 6 in the main exhaust conduit 4. In this case the ECU 10 sends output signals to control the system in such a way that the flow passage through the main conduit 4 is open and the flow through the bypass conduit 9 is closed in response to an output control indicating that no engine braking is desired and there is a desire to heat the gases. In these cases, the backpressure is set to at most to 5 bar, more preferably at most to 3.5 bars and most preferably at most to 2 bars. The ECU 12 controls the VGT 6 or a valve arrangement 13 or a combination of these to provide a desired backpressure according to the control signals from the control unit.

The invention claimed is:

1. An engine brake system for a vehicle provided with an engine, the system comprising:
   a main exhaust gas conduit,
   a turbo assembly comprising a turbine, the turbine being a Variable Geometry Turbine, the main exhaust conduit being connected to the turbine,
   an Exhaust Pressure Governor,
   a bypass conduit connected to the main exhaust conduit upstream of a connection of the main exhaust conduit to the turbine, the Exhaust Pressure Governor being located in the bypass conduit,
   a valve arrangement of the main exhaust conduit downstream of the bypass conduit connection for closing the main exhaust conduit, and
   an ECU, the ECU being arranged to control the valve arrangement to cut off or allow flow in the main exhaust conduit, the ECU being arranged to control the Exhaust Pressure Governor to cut off or allow flow in the bypass conduit, the ECU being arranged to determine, as a function of engine parameters and driving conditions, whether it is or is not desired to control the valve arrangement and the Exhaust Pressure Governor to create a backpressure in the exhaust system so as to function as an engine brake, to provide output signals to control the valve arrangement and the Exhaust Pressure Governor to open a flow passage through the main exhaust conduit and close a flow passage through the bypass conduit in response to a determination that no engine braking is desired, and, when there is a determination that engine braking is desired, to provide output signals to close the flow passage through the main exhaust conduit and open a flow passage through the bypass conduit and control the Exhaust Pressure Governor to provide a desired backpressure.

2. An engine brake system for a vehicle according to claim 1, comprising a source of compressed air connected to the Exhaust Pressure Governor and a pressure regulator arranged to set a backpressure of the Exhaust Pressure Governor to a desired value.

3. An engine brake system for a vehicle according to claim 1, wherein the main exhaust conduit is provided with a flow regulator which is adapted to create a controlled back pressure.

4. An engine brake according to claim 3 wherein the Variable Geometry Turbine comprises an arrangement for creating backpressure.

5. An engine brake system for a vehicle according to claim 1, wherein the main exhaust conduit is provided with a flow valve adapted to switch between being open and dosed, flow in the main exhaust conduit being cut off completely when the flow valve is closed.

6. An engine brake system for a vehicle according to claim 1, wherein the bypass conduit is connected to the main exhaust conduit downstream of an exhaust gas manifold arranged to receive exhaust gases from cylinders of the engine.

7. An engine brake system for a vehicle according, to claim 1, wherein the ECU is arranged to determine whether there is a need for the exhaust system to function as the engine brake and, upon determining that there is the need for the exhaust system to function as the engine brake, to control the valve arrangement and the Exhaust Pressure Governor to create the backpressure in the exhaust system so as to function as the engine brake.

8. A method for controlling the exhaust gas pressure of an exhaust system, the exhaust system comprising a main exhaust gas conduit connected to an exhaust manifold collecting exhaust gases from the cylinders of the engine, a turbo arrangement, comprising a Variable Geometry Turbine, having its turbine connected to the main exhaust conduit, a bypass conduit connected to the main exhaust conduit upstream of the turbo arrangement, an Exhaust Pressure Governor connected to the bypass conduit, a valve arrangement for controlling the exhaust gas flow to flow through the main exhaust conduit or the bypass conduit comprising the Exhaust Pressure Governor, a control system which controls the Exhaust Pressure Governor, the Variable Geometry Turbine and the valve arrangement for controlling the exhaust gas flow to flow through the main exhaust conduit or the bypass conduit, the method comprising controlling the exhaust gas system via the control system by:

opening, a flow passage through the main exhaust conduit and closing flow through the bypass conduit in response to an output control indicating that no engine braking is desired, and when there is an output control indicating that engine braking is desired, closing the flow passage through the main exhaust conduit and opening the flow through the bypass conduit and controlling, the Exhaust Pressure Governor to provide a desired backpressure according to control signals from the control system.

9. A method according to claim 8, comprising controlling the exhaust gas system so that the flow passage through the main exhaust conduit is closed and the flow through the bypass conduit is open when there is an output control indicating that engine braking is desired and, when control signals from the control unit, indicate that a backpressure needed is at least 2 bar, controlling the Exhaust Pressure Governor to provide a desired backpressure according to the control signals.

10. A method according to claim 8, comprising controlling the exhaust gas system so that the flow passage through the main exhaust conduit is open and the flow through the bypass conduit is closed in response to an output control indicating that no engine braking is desired and there is a desire to heat the gases, and, when control signals from the control unit indicate that a backpressure needed is at most 5 bar, controlling at least one of the Variable Geometry Turbine and the valve arrangement in the main exhaust conduit to provide a desired backpressure according to the control signals.

11. A method according to claim 9, comprising controlling the exhaust gas system so that the flow passage through the main exhaust conduit is open and the flow through the bypass conduit is closed in response to an output control indicating that no engine braking is desired and there is a desire to heat the gases, and, when control signals from the control unit indicate that a backpressure needed is at most 5 bar, controlling at least one of the Variable Geometry Turbine and the valve arrangement in the main exhaust conduit to provide a desired backpressure according to the control signals.

* * * * *